H. T. SNYDER.
BOTTLE SEALING MACHINE.
APPLICATION FILED JUNE 22, 1912.
1,089,875.
Patented Mar. 10, 1914.
2 SHEETS—SHEET 2.
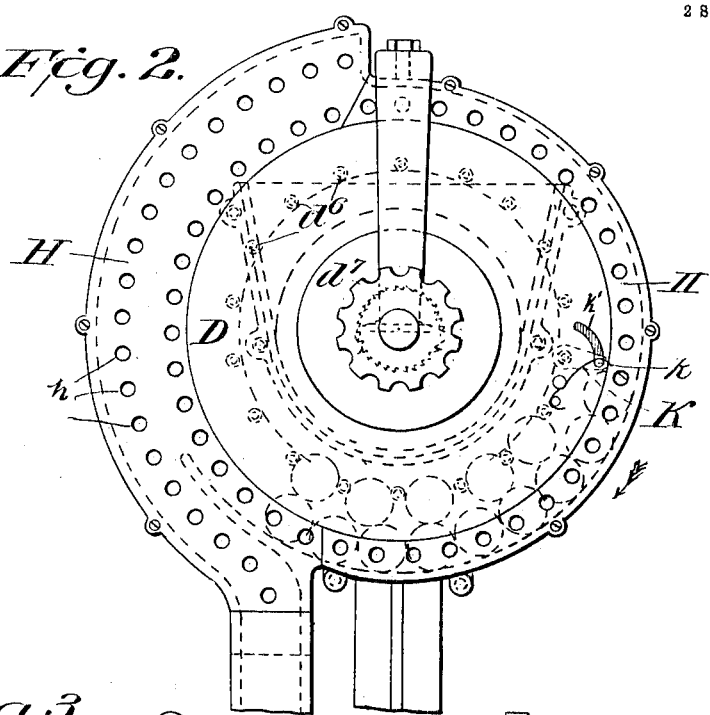
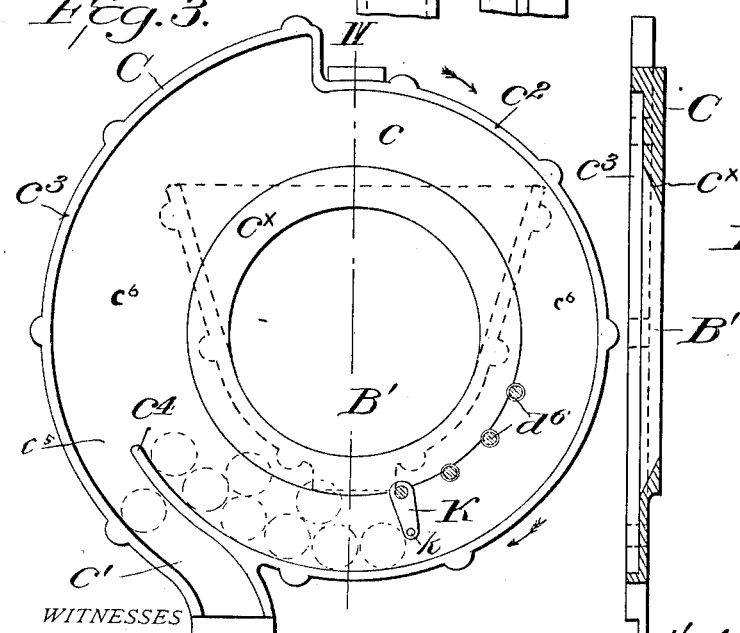
WITNESSES
INVENTOR
Herbert T. Snyder.
By Hector T. Fenton
His Attorney

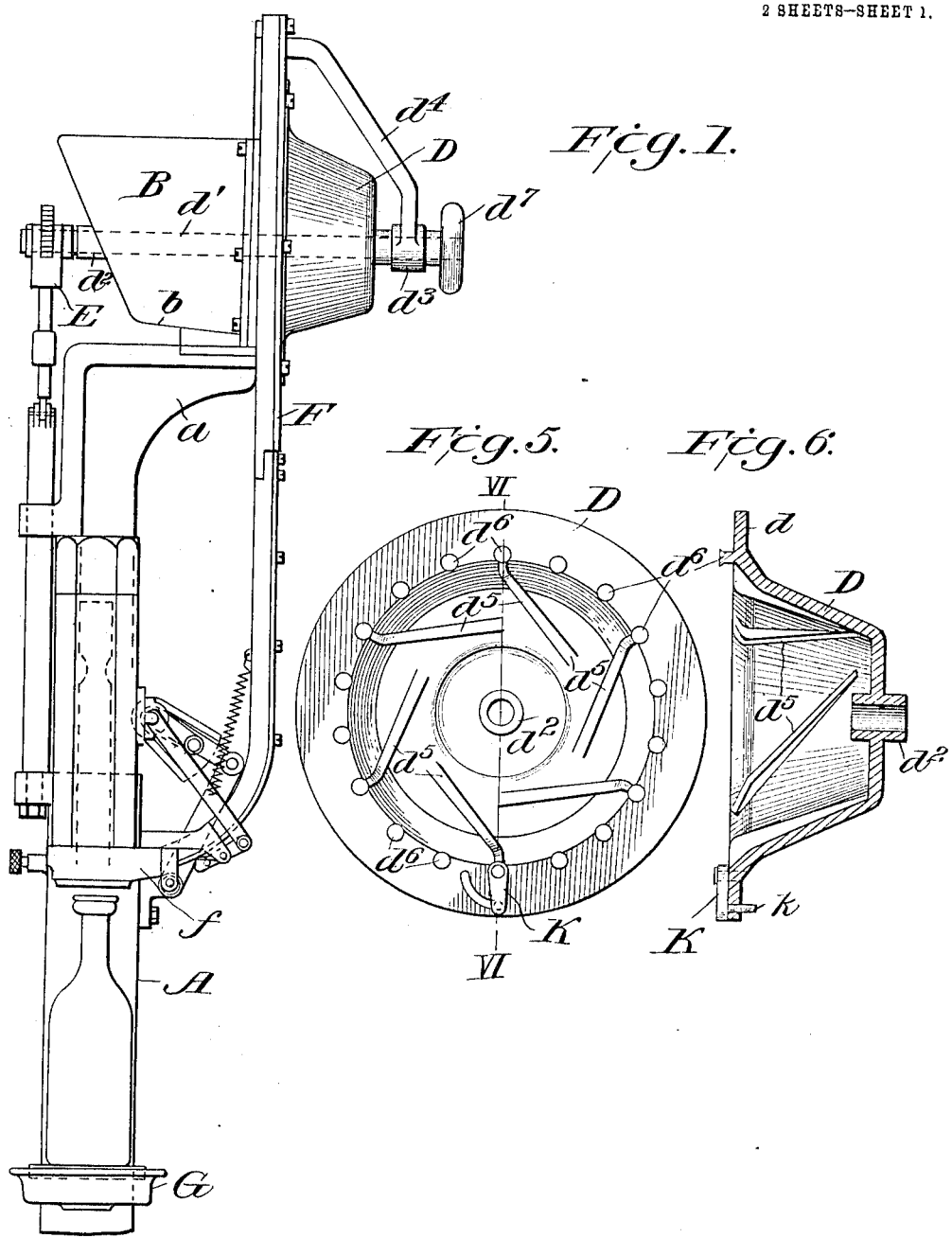

UNITED STATES PATENT OFFICE.

HERBERT T. SNYDER, OF BALTIMORE, MARYLAND.

BOTTLE-SEALING MACHINE.

1,089,875.  Specification of Letters Patent.  Patented Mar. 10, 1914.

Application filed June 22, 1912. Serial No. 705,178.

*To all whom it may concern:*

Be it known that I, HERBERT T. SNYDER, a citizen of the United States, residing at Baltimore, in the State of Maryland, have invented certain new and useful Improvements in Bottle-Sealing Machines, of which the following is a full, clear, and exact specification.

My invention relates to machines for sealing bottles, of that class wherein a metallic sealing cap is fed from a combined hopper and rotating feed drum, to and through a vertically disposed chute to a sealing head and brought thereby into sealed contact with the lip and neck of the bottle.

The present invention consists of an improved hopper and feed drum, for automatically feeding the caps, one by one, to the sealing mechanism aforesaid; and has for its object to improve the construction of the hopper and feed drum in such manner and with such novel combining elements, as to accurately and positively cause the caps to be properly fed to the chute leading to the sealing mechanism, and prevent any clogging of the feed drum and the guideway leading therefrom and from the hopper, and hence prevent any crushing or mashing of the caps in such feed mechanism; these objects being effected by the hereinafter described means for feeding a plurality of rows of caps, instead of a single row, and by co-acting means for positively clearing the guide way of caps at each revolution of the feed drum.

Referring to the accompanying drawings wherein similar letters of reference are used to indicate corresponding parts in each of the several views:—Figure 1 is a side elevation of a portion of a machine of the type described, embodyng the features of the present invention; Fig. 2 is a front elevation of the hopper and feed drum; Fig. 3 is an elevation, partly in section, of the hopper with the feed drum removed therefrom; the sealing disks being indicated by the dotted lines. Fig. 4 is a sectional view on the line IV—IV of Fig. 3; Fig. 5 is a front elevation of the feed drum removed from the hopper; and Fig. 6 is a sectional view on the line VI—VI of Fig. 5.

In the drawings A indicates a pedestal or support provided at its top with a forwardly extending portion $a$. On said forwardly extending portion $a$ is securely mounted a hopper B, for containing the sealing caps or disks. The bottom of said hopper is inclined as at $b$, and to the forward portion of said hopper is mounted a relatively rotatable feed drum D hereinafter described, by means of a spacing plate C interposed between them. Said plate C is shown in section in Fig. 4 and has a central circular opening with an outwardly inclined wall $c^x$ adapted to coincide with the discharge end of the hopper; it is provided with flanged portions $c^3$ whereby it may be secured in assembled position with the hopper and drum; it is circularly recessed at $c^6$ and is provided with an interior and upwardly curved flange portion $c^4$ which forms one wall of a curved guideway into which the sealing caps are discharged from the hopper; this part of the guideway is like the entire guideway so proportioned as to admit a plurality of rows of sealing disks while the curved flange $c^4$ which forms its terminal extends upwardly to a plane coincident with the lowest plane of rotation of the controlling pins or projections $d^6$ hereinafter described. Mounted rotatably on the face of said interposed spacing plate C is a relatively rotatable feed drum D, which is preferably frusto-conical in form and is provided with a flange $d$ which constitutes one of the walls of the guideway, the other walls of which being formed, as before stated, by the interior face and upwardly curved flange $c^4$ of the interposed plate C. Said drum is mounted to rotate upon a shaft $d'$ having one end mounted in a boss $d^2$ formed in the hopper B, the other end of said shaft being mounted in a bearing $d^3$ carried by an arm $d^4$ depending from the upper portion of the plate C. The feed drum is rotated in the direction shown by the arrow in Figs. 2 and 3, in order to bring the caps successively to the delivering end of the curved guideway, and enable the elements adjunctive thereto to perform their intended functions hereinafter described. The interior of the drum is provided with tangential ribs $d^5$, which serve to direct the caps or disks as they enter the drum from the hopper toward and between the pins or projections $d^6$, carried by the flange $d$, said pins being properly spaced to permit a single cap or disk to pass between them, the pins being so arranged that the cap will pass readily between them when fed in proper position, but if improperly turned, said cap will wedge between the pins and be forced back into the mass of caps. The shaft $d'$ is intermittently rotated by any suitable mechanism, for feeding the caps into the guideway, one form of such mechanism being indicated at E. As said mechanism forms no part of the present invention no further description thereof is deemed necessary herein as any of the well known forms of actuating mechanism commonly employed in machines of this class for intermittently rotating the feeding drum might be utilized. The shaft $d'$ is provided with a hand wheel $d^7$ for operating the feed drum D to fill the chute with caps preliminary to the operation of the machine. From the part $c'$ of the guideway leads a chute F, formed of sections, the lowermost section being curved to a horizontal plane, as indicated at $f$, to support the caps or disks as they are fed below the opening of the sealing head through which, in the operation of sealing, the bottle neck projects. Any suitable mechanism for retaining the disk or cap in position beneath the sealing head and above the bottle neck may be employed. When the feed drum D is placed in position so that the flange $d$ forms the opposite side wall of the guideway, cover plates H are removably secured to the plate C, the inner face of said plate C and the inner face of the cover plates H and the flange $d$ form the side walls of the guideway. Said cover plates H are provided with openings $h$ which not only act as sight openings, but tend to lightness in the construction of the machine. The plate C is formed with flanges $c^2$ and $c^3$. The space thus provided for the caps in said guideway, that is the distance between the pins $d^6$ and the outer edge or plate C of the guideway is somewhat greater than the size or diameter of the cap or disk being used. The clearance or space thus provided for the cap exists the entire distance around said guideway. By providing this clearance space the crushing of the caps or disks against the upper portion of the inner surface of the guideway, when the caps ride up and with and on the pins $d^6$ is entirely prevented, as such caps instead of being jammed and mashed, as frequently occurs in machines of this character heretofore in use, are carried entirely around and back in position to be delivered to the chute. As the caps are fed between the pins they, of course, drop to the bottom of the guideway. When the guideway is filled, any further caps coming between the pins are acted upon and carried around by the pins, the outer edges of said last mentioned caps resting on the caps first fed to the guideway, (as indicated in dotted lines Figs. 2 and 3), carry or force the first mentioned caps around through the guideway and when the caps in the lower row reach the opening $c'$ to the chute they drop therein and continue on their course to the sealing head. To prevent jamming or wedging of the caps at the entrance $c'$ to the chute, from the guideway which might be occasioned in view of the fact that two rows of caps are being fed simultaneously, I extend the flange $c^2$ of the plate C a short distance upward as at $c^4$. The plate C is so shaped and constructed that not only is the clearance space between the pins and the outer edge of the plate considerably greater than the diameter of the disks being fed, but the distance between the pins and the flange $c^3$ of the plate is still greater so as to provide a storage space for the cap as at $c^5$ above the entrance $c'$ to the chute F. By thus constructing this plate C all danger of the caps jamming or being mashed is obviated and the positive and continuous feed of the caps to the guideway and hence to the chute is insured so long as the feed drum is rotated, as the caps being forced toward the portion $c^4$ of the plate, when they reach said point drop by gravity into the entrance to the chute and continue on their course.

In order to insure a clearance of the guideway at each revolution of the feed drum a spring actuated finger K is mounted on one of the pins at any desired point. To limit and guide said finger K in its movement a pin $k$ is secured thereto and projects through a curved slot $k'$ in the flange $d$, as clearly shown in Figs. 2 and 6. It will be seen that this finger passing back of the line of caps will force said caps along in the event that said caps are regularly fed beneath the sealing head. However, should any resistance be met with, such for instance as might be caused if a cap did not happen to be properly positioned or removed from the portion of the chute beneath the sealing head, then the spring actuated finger K will be forced backward against the tension of the spring and will ride over the tops of the caps in the guideway and be returned to position for use after the obstruction has been removed. By the provision of the spring pressed finger I am enabled to clear the guideway at each revolution of the feed drum of all caps in the guideway and thus insure at all times a sufficient quantity of caps for operating conditions.

The operation of the machine will be clearly understood from the foregoing description and it will be readily understood that in practice the caps or disks are placed in the hopper B from which they are fed by gravity through the opening B′ in the plate C down the inclined wall $c^x$ between the pins $d^6$ which surround the lower edge of the incline $c^x$, into the guideway. Said guideway being of a size considerably greater than the diameter of said disks, it will be seen that one row of disks and a larger portion of the disks of a second row are admitted into the guideway, said second row being, on the rotation of the feed drum forced forwardly toward the entrance to the chute, the caps being forced forwardly by the pins resting on the edges of the innermost row of caps consequently forces the outermost row forward by a rolling contact with them until the foremost cap reaches the part $c^4$ when said cap drops over said lip and into the chute. As the cap drops out of the guideway into the chute other caps are constantly being fed into position for operation thereon by the pins.

Having thus fully described my invention what I claim as new and desire to secure by Letters Patent is:—

1. In a machine for sealing bottles with metallic caps, the combination with a hopper, a feed drum adapted to be rotated relatively to the hopper and a connecting flanged spacing plate interposed between them, said drum provided with a flange forming with said flanged plate, an upwardly extending endless curved guideway between said drum and plate adapted to receive a plurality of rows of caps in proper position throughout the entire guideway, and means carried on the face of said drum for directing the caps to said guideway.

2. In a machine for sealing bottles, the combination with a hopper, a feed drum adapted to be rotated relatively thereto and provided with a series of cap-positioning and propelling pins, a connecting spacing plate interposed between said elements and having an interior and upwardly curved flange, said plate forming, with the interior wall of said drum, a curved guideway extending upwardly to a plane coincident with the lowermost plane of rotation of said cap-propelling pins and adapted to receive a plurality of rows of sealing caps throughout the entire guideway.

3. In a machine for sealing bottles, a hopper, a relatively rotatable feed drum, and an interposed flanged plate, said elements being constructed and combined to form a curved guideway, an annular series of spacing pins on one wall of said guideway, arranged thereon at a distance from the circumferential wall of the guideway sufficient to admit thereto a plurality of rows of caps throughout the entire guideway, said pins being out of contact with the outermost row of caps but contacting with the innermost row of caps, whereby on rotation of the feed drum the pins act on the innermost row of caps and through them, by a rolling contact, force the outermost row of caps in a direction toward the delivering end of the guideway, means for directing the caps to said pins, and resiliently controlled means extending into said guideway for positively forcing the caps toward the delivering end of said guideway.

4. In a machine for sealing bottles, a hopper, a relatively rotatable feed drum, and an interposed flanged plate, said elements being constructed and combined to form a curved guideway, an annular series of spacing pins on one wall of said guideway, arranged thereon at a distance from the circumferential wall of the guideway sufficient to admit thereto a plurality of rows of caps throughout the entire guideway, said pins being out of contact with the outermost row of caps but connecting with the innermost row of caps, whereby on rotation of the feed drum the pins act on the innermost row of caps and through them, by a rolling contact, force the outermost row of caps in a direction toward the delivering end of the guideway, means for directing the caps to said pins, and a spring pressed finger rotatably mounted on one of said pins and extending into said guideway, said finger adapted in its normal position to positively force the caps toward the delivering end of said guideway and clear the guideway on each revolution of the feed drum and when resistance is met with be forced backward and ride over the edge of the caps.

In testimony whereof I have signed my name to this specification in the presence of two subscribing witnesses.

HERBERT T. SNYDER.

Witnesses:
JOHN L. ALCOCK,
M. S. KAHN.

---

Copies of this patent may be obtained for five cents each, by addressing the "Commissioner of Patents, Washington, D. C."